United States Patent
Brennan

(10) Patent No.: US 12,490,758 B1
(45) Date of Patent: Dec. 9, 2025

(54) SAVORY COLLAGEN COMPOSITIONS

(71) Applicant: Meal Boosters LLC, Delran, NJ (US)

(72) Inventor: Shane Brennan, Rancocas, NJ (US)

(73) Assignee: Meal Boosters LLC, Delran, NJ (US)

( * ) Notice: Subject to any disclaimer, the term of this patent is extended or adjusted under 35 U.S.C. 154(b) by 389 days.

(21) Appl. No.: 18/129,706

(22) Filed: Mar. 31, 2023

(51) Int. Cl.
*A23J 3/04* (2006.01)
*A23L 27/10* (2016.01)

(52) U.S. Cl.
CPC ............ *A23J 3/04* (2013.01); *A23L 27/10* (2016.08)

(58) Field of Classification Search
CPC .................................. A23L 27/10; A23J 3/04
USPC .................................................. 426/656, 657
See application file for complete search history.

(56) References Cited

U.S. PATENT DOCUMENTS

2024/0415938 A1\* 12/2024 De Klerk-Engels ... A61K 38/01

FOREIGN PATENT DOCUMENTS

| CN | 108719931 A | \* | 11/2018 | ............ A23L 27/40 |
| JP | 2011067184 A | \* | 4/2011 | |
| KR | 102301569 B1 | \* | 9/2021 | ............ A23L 13/50 |
| WO | WO-2010108901 A1 | \* | 9/2010 | ............ C12P 19/32 |
| WO | WO-2011149356 A1 | \* | 12/2011 | ............... A61P 3/04 |
| WO | WO-2021131995 A1 | \* | 7/2021 | ........... A23L 29/281 |

OTHER PUBLICATIONS

Zen Principle: What is grass-fed collagen and what are its benefits? (Year: 2021).\*
Luo Translation (Year: 2018).\*
Nagase Translation (Year: 2011).\*
Bin Translation (Year: 2021).\*

\* cited by examiner

*Primary Examiner* — Jennifer McNeil
(74) *Attorney, Agent, or Firm* — Kim IP Law Group

(57) ABSTRACT

A savory collagen composition that includes collagen and a savory spice or flavor component, the savory collagen composition in the form of a scoopable powder.

15 Claims, No Drawings

SAVORY COLLAGEN COMPOSITIONS

The exemplary embodiments of the present application relate to savory compositions in the form of a scoopable powder and more particularly, savory protein, more particularly, savory collagen compositions in scoopable powder form.

BACKGROUND OF THE DISCLOSURE

The underlying biological and biochemical phenomena of taste perception has become better understood. Taste receptor proteins have been recently identified, such as the G protein coupled receptors believed to be involved in taste perception, T2Rs and T1Rs. (See, e.g., U.S. Pat. No. 9,072,313, Nelson, et al., Cell (2001) 106 (3): 381-390; Adler, et al., Cell (2000) 100 (6): 693-702; Chandrashekar, et al., Cell (2000) 100:703-711; Matsunami, et al., Number (2000) 404:601-604; Li, et al., Proc. Natl. Acad. Sci. USA (2002) 99:4962-4966; Montmayeur, et al., Nature Neuroscience (2001) 4 (S): 492-498: U.S. Pat. No. 6,462,148; and PCT publications WO 02/06254, WO 00/63166, WO 02/064631, and WO 03/001876, and U.S. Patent Publication No. US 2003/0232407 A1).

As disclosed in U.S. Pat. No. 9,072,313, whereas the T2R family includes a family of over 25 genes that are involved in bitter taste perception, the T1R5 only includes three members, T1R1, T1R2, and T1R3. (See Li, et al., Proc. Natl. Acad. Sci. USA (2002) 99:4962-4966.) It was disclosed in WO 02/064631 and/or WO 03/001876 that certain T1R members, when co-expressed in suitable mammalian cell lines, assemble to form functional taste receptors.

Particularly it was found that co-expression of T1R1 and T1R3 in a suitable host cell results in a functional T1R1/T1R3 savory ("umami") taste receptor that responds to savory taste stimuli, including MSG. As disclosed in Nature, the umami (savory) taste receptor was likely identified as a heteromeric complex of T1R1 and T1R3, i.e., human TlR1/TlR3 or hTIR1/hTIR3. Humans are known, for example, to categorically have a strong umani taste response to monosodium glutamate, which is savory and strongly activates TIR1/T1R3, and a low savory taste response to L-alanine, which tastes sweet and does not activate TIR1/T1R3 in the same manner. See, Toda, Y., Nakagita, T., Hirokawa, T. et al. Positive/Negative Allosteric Modulation Switching in an Umami Taste Receptor (T1R1/T1R3) by a Natural Flavor Compound, Methional. Sci Rep 8, 11796 (2018). https://doi.org/10.1038/s41598-018-30315-x.

Long before the scientific understanding of savory taste perception was obtained, humans have preferred to flavor their food with savory spices and flavor components to improve their taste. Often these savory spices and flavor components include sodium (e.g., monosodium glutamate) and maintaining the best possible health may dictate that their use be minimized. There remains a need to obtain the desired level of savory seasoning, while minimizing the amount of flavoring and spices incorporated. A mechanism to do so, while also incorporating a healthy component to facilitate this effort, would be of great benefit to the consumer.

BRIEF SUMMARY OF THE DISCLOSURE

The subject disclosure provides savory powder compositions, such as a savory collagen composition in scoopable powder form. It has been found, for example, that the effects of a savory spice or flavor component can be increased when combined with collagen, which itself provides known health benefits.

Accordingly, one embodiment of the present application provides a savory collagen composition that includes collagen and a savory spice or flavor component, the savory collagen composition in the form of a scoopable powder. The scoopable powder can be added to foods and beverages to provide a healthy supplement, while maximizing the savory effect of the added flavorant. Lower amounts of flavorant can be used with collagen, while still achieving the same savory effect.

In an exemplary embodiment, the collagen includes a mixture of type 1 and type 3 collagen peptides. In another exemplary embodiment, the collagen comprises an amino acid profile that includes at least 10 wt % glycine, at least 10 wt % histidine, at least 10 wt % hydroxyproline, and at least 10 wt % proline, and/or the amino acid profile comprises less than 1 wt % of methionine, and less than 1 wt % of tyrosine. In yet another exemplary embodiment, the collagen consists essentially of collagen obtained from grass fed animals.

In another exemplary embodiment, the savory spice or flavor component is selected from a buffalo flavor component, a cheese flavor component, a Mexican spice flavor component, an Italian seasoning flavor component, a chili spice or flavor component, an Asian flavor component (e.g., an Umami flavor component), a BBQ flavor component (e.g., a mesquite or honey BBQ flavor component) and a garlic and herb flavor component.

Another embodiment of the present application provides a method of incorporating a savory spice or flavor component to a food that includes introducing collagen and the savory spice or flavor component to the food. The collagen can be introduced to the food before cooking, while cooking, and/or after cooking the food. In an exemplary embodiment, the collagen and the savory spice or flavor component is introduced prior to cooking the food, or even more preferably, while cooking the food.

Yet another embodiment of the present application provides a method for preparing a powdered savory collagen composition that includes adding an initial amount of a savory spice or flavor component; adding an amount of a powdered collagen; and adding a second amount of the savory spice or flavor component. In a further embodiment, the method includes mixing the initial amount of savory spice or flavor component and the amount of powdered collagen prior to adding the second amount of the savory spice or flavor component.

In an exemplary embodiment, the method further includes adding a second amount of powdered collagen after adding the second amount of the savory spice or flavor component. In yet another exemplary embodiment, further includes adding a third amount of the savory spice or flavor component.

Yet another exemplary embodiment of the present application provides a protein supplement for coffee, tea and other hot beverages that includes a protein (i.e., a complete or incomplete protein) and a salt. In one embodiment, the protein is collagen (e.g., a collagen containing type I and type III collagen peptides). The protein supplement's inclusion of salt alleviates the dehydrating effect of coffee, counteracting the sodium that is lost through urination with each cup of coffee consumed, while also providing the health benefits of collagen.

Other features and advantages of the subject disclosure will be apparent from the following more detailed description of the exemplary embodiments.

DETAILED DESCRIPTION OF THE DISCLOSURE

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

A "savory spice or flavor component" as used herein refers to a component that elicits the "mouth-watering," "umami" taste sensation that is known in the art. On a biochemical level, a "savory spice or flavor component", when consumed by a human, activates the hTIR1/hTIR3 receptor in a manner akin to monosodium glutamate, as compared to the week response of the hTIR1/hTIR3 receptor to L-alanine, so as to elicit a detectable savory flavor by the consuming human.

"Exemplary" as used herein shall mean "example" only and is not intended to identify any embodiment or structure as preferred or more desirable than any other.

Throughout this disclosure, various aspects of the exemplary embodiments can be presented in a range format. It should be understood that the description in range format is merely for convenience and brevity and should not be construed as an inflexible limitation on the scope of the exemplary embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments may be combined in any suitable manner in one or more embodiments. One skilled in the relevant art will recognize, in light of the description herein, that the exemplary embodiments can be practiced without one or more of the specific features or advantages of a particular embodiment. In other instances, additional features and advantages may be recognized in certain embodiments that may not be present in all embodiments of the subject disclosure.

As used herein, the term "cooking" refers to the bringing a food to an elevated temperature for a sufficient period of time to render the food suitable, or more desirable, for consumption. While in some embodiments, one or more of the collagen and savory spice or flavor component are introduced before, during and or after cooking, in other embodiments, each the collagen and the savory spice or flavor component is introduced and no cooking step is performed, such as in the case of dips and spreadable servings (e.g., spreadable with a knife or spoon) of a food.

"Scoopable powder" as used herein refers to composition that is in the form of loose particles and is capable of being manually accumulated by a user with a spoon, scoop or other hand-maneuvered receptacle. As used herein, the term "powder" is generally intended to refer to all particle sizes capable of being manually accumulated by a user as described above, and includes granules (e.g., granules of up to 1 or 2 cm or higher) as well as much finer particle sizes.

A "salt" as used herein, refers to all forms of the mineral sodium chloride that, along with trace elements and acceptable levels of impurities, is commonly added to food. Salts include, but are not limited to regular table salt (e.g., iodized table salt), sea salt (e.g., Himalayan sea salt, smoked gray sea salt), kosher salt, rock salt, coarse salt, truffle salt, fleur de sel, maldon salt, red salt, and black salt, among others.

An anti-caking agent (e.g., a GRAS anti-caking agent), such as silicon dioxide or the like, can be introduced to the composition as needed to assist with flowability and ease of use.

In certain embodiments the savory spice or flavor component is a buffalo flavor component. As would be understood in the art, buffalo flavor refers to a savory flavor made prominent by "buffalo" chicken wings, but now applied to a variety of foods. In certain embodiments, the buffalo flavor component includes, is characterized by, or consists essentially of, cayenne pepper (e.g., cayenne red pepper) or by it's inclusion of a flavor component that, in turn, is characterized by, or consists essentially of cayenne pepper (e.g., cayenne red pepper).

In one exemplary embodiment, the buffalo flavor component includes cayenne pepper, vinegar (e.g., distilled vinegar), garlic and paprika. In one exemplary embodiment, the buffalo flavor component consists essentially of, or consists of, cayenne pepper sauce powder (which includes corm maltodextrin, cayenne red pepper, distilled vinegar, salt, natural flavor, and garlic), corn maltodextrin, salt, spices including paprika, garlic, sugar, silicon dioxide and paprika extract.

In certain embodiments the savory spice or flavor component is a Mexican spice flavor component. As would be understood in the art, Mexican spice is generally synonymous with the terms "taco seasoning" and "burrito seasoning" and refers to the smokey, earthy and usually (though not always) spicy flavor that accompanies Mexican-themed cuisine entrees in restaurants, such as tacos, burritos, fajitas, etc., such as being used to season the meat or protein featured in the dish. In certain embodiments, the Mexican spice flavor component includes one or more of cumin, chili peppers, oregano and garlic.

As used herein, a chili spice or flavor component refers to a component that includes powders or ground components of chili peppers as a primary taste component, and thus is characterized by, or consists essentially of powders or ground components of chili peppers.

In certain embodiments, the savory spice or flavor component is an Italian seasoning flavor component. As would be understood in the art, Italian seasoning refers to the savory, earthy herb flavor that can also accompanied with sweet notes, often contributed by oregano and/or marjoram. In certain embodiments, the Italian seasoning flavor component includes, is characterized by, or consists essentially of, rosemary, basil, thyme and oregano; and optionally further includes one or more of marjoram, parsley, sage and savory spice (i.e., the savory herb, including winter savory and/or summer savory herb variety).

In certain embodiments, the savory spice or flavor component is a garlic and herb seasoning flavor component. In certain embodiments, the garlic and herb seasoning flavor component includes, is characterized by, or consists essentially of garlic, onion and spices selected from one or more of black pepper, parsley, fennel, basil, bay, marjoram, oregano, savory and thyme.

In certain embodiments, the savory spice or flavor component is an Asian seasoning flavor component. In one embodiment, the Asian seasoning flavor component includes one or more of ginger, cinnamon, cumin, ground peppers (e.g., Sichuan Pepper), star anise and bay leaves, particularly suitable for stir fry and Chinese cuisine. In another embodiment, the Asian seasoning flavor component includes one or more of ground mushrooms, mustard (e.g., mustard bran) and onion (i.e., that known in the art as an "Umami Seasoning." In yet another embodiment, the Asian seasoning flavor component includes one or more of garlic, sesame seed, orange peel, red bell pepper, ginger and toasted coconut.

In one exemplary embodiment, the savory spice and flavor component does not include monosodium glutamate (MSG). In another exemplary embodiment, the savory spice and flavor component (e.g., the Asian seasoning flavor component) does include MSG.

In certain exemplary embodiments, the collagen comprises, consists essentially of, or consists of a mixture of type 1 and type 3 collagen peptides. Preferably, the collagen is obtained from grass fed animals, such as exclusively grass fed animals (e.g., a grass fed cow). Alternatively, in other embodiments the collagen is obtained from a fish, or is plant-based (e.g., certified vegetarian or vegan) collagen. In other embodiments, the collagen, savory spice or flavor component, and/or all other components (e.g., the entire composition) is certified Kosher or certified Halal.

In certain exemplary embodiments, the collagen has an amino acid profile as set forth, or substantially as set forth, in Table 1, which is based on an exemplary serving size of 21 g (2 scoops) of the prepared composition. Natural variations will occur, and accordingly, the collagen, in other exemplary embodiments, has a mean or a median amino acid profile as set forth in Table 1 (e.g., ±20%, ±10%, ±5%, ±2.5% of the stated value).

TABLE 1

Exemplary Amino Acid Profile of Collagen

| | |
|---|---|
| Alanine | 1620 mg (8.2 wt %) |
| Arginine | 1680 mg (8.5 wt %) |
| Glutamic Acid | 1322 mg (6.7 wt %) |
| Glycine | 2482 mg (12.6 wt %) |
| Histidine | 4120 mg (20.9 wt %) |
| Hydroxylysine | 170 mg (0.9 wt %) |
| Hydroxyproline | 2280 mg (11.5 wt %) |
| Isoleucine | 310 mg (1.6 wt %) |
| Leucine | 588 mg (3.0 wt %) |
| Lysine | 680 mg (3.4 wt %) |
| Methionine | 130 mg (0.7 wt %) |
| Phenylalanine | 420 mg (2.1 wt %) |
| Proline | 2300 mg (11.6 wt %) |
| Serine | 680 mg (3.4 wt %) |
| Threonine | 380 mg (1.9 wt %) |
| Tyrosine | 100 mg (0.5 wt %) |
| Valine | 488 mg (2.5 wt %) |

While not being bound by any particular theory, it is believed that the powdered collagen composition acts as a delivery agent for the savory spice or flavor component, serving to potentiate, multiply or enhance the savory effect of the savory spice or flavor component, such as a savory spice or flavor component that is itself provided in powdered (e.g., granular) form prior to being introduced to the collagen. For example, less monosodium glutamate or other savory spice or flavor components can be added when combined with collagen, while achieving the same savory sensation as would be obtained by higher amounts of the same component without the collagen. Accordingly, the instantly described compositions can be employed to provide the health benefit of collagen while potentiating the effect of the savory spice or flavor component, which itself may be relatively high in sodium and it's use is beneficially minimized.

Certain embodiments of the present application provide a sandwich method of mixing the collagen and the savory spice or flavor component that includes, in sequential order, adding an initial amount of savory spice or flavor component, adding an amount of collagen, optionally mixing, and then adding a second amount of savory spice or flavor component, and then mixing the added components. After mixing, an additional amount of collagen, and/or an additional amount of savory spice or flavor component can sequentially be added to complete the production lot. Alternatively, the order of introducing the savory spice or flavor component and collagen can be reversed. Furthermore, in exemplary embodiments, the steps can be repeated such that the collagen and savory spice or flavor component is added over three, four or five intervals. An anti-caking agent can optionally be introduced as needed to facilitate flowability.

Other exemplary embodiments of the subject application provide a composition that includes a protein (e.g., a complete or incomplete protein) and a salt for use in coffee, tea or other hot beverage (e.g., a hot caffeinated beverage). In one embodiment, the protein is collagen (e.g., a collagen containing type I and type III collagen peptides). The protein supplement inclusion of sodium alleviates the dehydrating effect of coffee to counteract the sodium that is lost through urination with each cup of coffee consumed, while also providing the health benefits of collagen.

The salt that can be combined with the protein (e.g., collagen) can be, in certain embodiments, any form of salt that provides dietary sodium and includes, but is not limited to, regular table salt (e.g., iodized table salt), sea salt (e.g., Himalayan sea salt, smoked gray sea salt), kosher salt, rock salt, coarse salt, truffle salt, fleur de Sel, maldon salt, red salt, and black salt, among others.

In certain embodiments, the amount of salt in the protein supplement for coffee, tea or other hot beverage is at least 10 mg, or at least 50 mg, or at least 100 mg, or at least 200 mg, or at least 250 mg per serving. In certain embodiments, the amount of salt ranges from about 10 mg to about 500 mg, or from about 50 mg to about 500 mg, or from about 100 mg to about 400 mg, or from about 250 to about 300 mg. The amounts of salt can optionally be adjusted based on the amount of caffeine in the beverage. For example, a tea beverage, which contains less caffeine than drip coffee, could employ 10-100 mg of salt per serving, whereas drip coffee can employ 250-300 mg of salt.

Example 1—Cheese Collagen Powder

A 15 kg of bag of collagen powder (containing type 1 and type 3 collagen peptides), a ¾ full bag of cheese powder (a full bag weighing about 12 kg) are assembled in proximity to a cheese bin, 2 hand shovels, and an electric mixer. Half of the allotted cheese powder (⅜ of the bag) is added to the cheese bin to form an initial layer. The 15 kg bag of collagen is then added to the cheese bin, and then the remaining half (⅜ of the bag) is added to the cheese bin. The two hand shovels are used to mix the collagen and cheese powder thoroughly, and then the electric mixer is employed to further mix the two components. After use of the electric mixer, the two hand shovels are again employed to mix the contents while visually inspecting the mixture, and the electric mixer is then used a second time to ensure complete mixing of the collagen and cheese powder. The mixing step can be repeated (or performed once) as necessary to provide proper mixing.

Typical Amino Acid Profiles per serving are generally as set forth above in Table 1, though natural variations may occur. A serving size is considered 21 g (2 scoops), which contains about 90 calories, 2 g of total fat (1.5 g saturated, 0 g trans), 240 mg of sodium, 2 g of total carbohydrates (0 g of fiber, 2 g total sugars with 0 g of added sugar), and 15 g of protein. A single serving does not contain significant amounts of cholesterol, vitamin D, calcium, iron, and potassium. This exemplary embodiment contains no added sugar.

Example 2—Buffalo Collagen Powder

A 15 kg of bag of collagen powder, 6 and ¼ bottles of buffalo powder (each package weighing about 0.6 kg) are assembled in proximity to a buffalo bin, 2 hand shovels, and an electric mixer. Two bottles of the buffalo powder is added to the buffalo bin to form an initial layer. One half of the 15 kg bag of collagen (i.e., 7.5 kg) is then added to the buffalo bin, and then two more bottles of the buffalo powder is added to the buffalo bin. The two hand shovels are used to mix the collagen and buffalo powder thoroughly. Once thoroughly mixed, the rest of the collagen and the remaining 2 and ¼ bottles of buffalo powder are added to the buffalo bin. The two hand shovels are again employed to mix the contents while visually inspecting the mixture, and the electric mixer is then used to ensure complete mixing of the collagen and buffalo powder. The mixing step can be repeated as necessary to provide proper mixing.

Typical Amino Acid Profiles per serving are generally as set forth above in Table 1, though natural variations may occur. A serving size is considered 21 g (2 scoops), which contains about 80 calories, 0 g of total fat, 360 mg of sodium, 4 g of total carbohydrates (0 g of fiber, 2 g total sugars with 2 g of added sugar), and 15 g of protein. A single serving does not contain significant amounts of cholesterol, vitamin D, calcium, iron, and potassium.

Example 3—Unflavored Collagen Powder

One 15 kg bag of collagen is introduced to a collagen bin. A hand shovel is employed to sift through the collagen while visually inspecting the collagen. Typical Amino Acid Profiles per serving are generally as set forth above in Table 1, though natural variations may occur. A serving size is considered 21 g (2 scoops), which contains about 80 calories, 0 g of total fat, 45 mg of sodium, 0 g of total carbohydrates (0 g of fiber, 0 g total sugars with 0 g of added sugar), and 20 g of protein. A single serving does not contain significant amounts of cholesterol, vitamin D, calcium, iron, and potassium. This exemplary embodiment has no sugar, and thus no added sugar.

The unflavored collagen powder is labeled for suggested use with, for example, a savory food (e.g., eggs, rice, pasta, tomatoes, sauces, soups, broths, gravy), a savor spice or a savory flavor.

Example 4—Use of Collagen as a Savory Flavor Delivery Agent

Two entrées—rice and ground turkey—were prepared for tasting trials with savory seasoning by a panel of the instant inventors' colleagues. Three arms of each entrée were prepared as follows:

Arm 1: Plain rice cooked in boiling water, tossed in skillet to reheat; plain ground turkey cooked over a stove top.

Arm 2: Rice mixed with 5 g of buffalo powder during the reheat step and cooked as in Arm 1; ground turkey mixed with 7 g of cheese powder and cooked as in Arm 1.

Arm 3: Rice mixed with 5 g of buffalo powder+14 g of collagen of Example 3 and cooked as in Arm 1 with the seasoning added during the reheat step; ground turkey mixed with 7 g of cheese powder+14 g of collagen of Example 3 and cooked as in Arm 1.

Roughly equal amounts of the entrée (i.e., rice and ground turkey) were used in the Arms, particularly Arms 2 and 3. Each panelist consumed Arm 1, and this experience was deemed a 5 on the 1-10 scale (10=best). The panelists (2 panelist tasting blind, 2 panelist with knowledge) rated Arms 2 and 3 for taste and texture. The results are shown below:

Cheesy Ground Turkey (Arm 1=5)

| Panelist | Flavor | | Texture | |
|---|---|---|---|---|
| | Arm 3 (Collagen) | Arm 2 | Arm 3 (Collagen) | Arm 2 |
| Blind 1 | 6 | 6 | 6 | 5 |
| Blind 2 | 6 | 5 | 5 | 5 |
| Non-Blind 1 | 8 | 6 | 6.5 | 4 |
| Non-Blind 2 | 8 | 6 | 6 | 4 |

Buffalo Rice (Arm 1=5)

| Panelist | Flavor | | Texture | |
|---|---|---|---|---|
| | Arm 3 (Collagen) | Arm 2 | Arm 3 (Collagen) | Arm 2 |
| Blind 1 | 7 | 5 | 5 | 7 |
| Blind 2 | 4 | 5 | 5 | 7 |
| Non-Blind 1 | 7 | 5 | 5 | 7 |
| Non-Blind 2 | 8 | 6 | 8 | 6 |

It was qualitatively observed by all panelist that Arm 3 (the collagen arm) took away bitterness, adding a sweeter taste or aspect. It was also observed that the collagen arm also allowed the flavor to stand out more.

Arm 3 (the collagen) arm was also determined by all panelists to be more appetizing in appearance (i.e., more visualizing appealing) believed to be due to the sheen obtained from collagen. Differences noted to represent a stark contrast.

In each arm above, the collagen arm was the more vibrant product. Also, in the collagen arm, the color of the savory flavoring was better distributed equally about the entree in the collagen arm as opposed to Arm 2. Stated differently, in Arm 3 it appears based on visual observation that the flavor is better mixed with the food, being better and more equally absorbed across the entirety of the food mass, and being more visually integrated with the food. In contrast, the non-collagen arm exhibited "flavor clumps," i.e., masses of aggregated flavor, which were observed by at least one panelist to yield a very noticeable, gritty burst of the powdered additive when consumed in the non-collagen arms.

Color photographs depicting the ground turkey in the process of being cooked as used in the above example can be made available if helpful for purposes of examination.

In conclusion, arm 3 (collagen) was determined to be the preferred option by all panelists.

Example 5—Use of Collagen as a Protein Supplement for Coffee

Two hundred fifty to three hundred (250-300) mg of Himalayan sea salt is introduced to ten (10) grams of the Collagen composition of Example 3 and thoroughly mixed. The mixed composition is then added to a cup (8 oz.) of coffee, mixed and consumed.

For the sake of brevity, all references listed in this application are hereby incorporated by reference in their entirety for all purposes, including, but not limited to, the particular context in which the reference is cited.

The invention claimed is:

1. A savory collagen composition comprising (a) collagen and (b) a savory spice or flavor component, the savory collagen composition in the form of a scoopable powder, wherein the savory collagen comprises an amino acid profile that includes at least 10 wt % glycine, at least 10 wt % histidine, at least 10 wt % hydroxyproline, and at least 10 wt % proline.

2. The savory collagen composition of claim 1, wherein the collagen comprises a mixture of type 1 and type 3 collagen peptides.

3. The savory collagen composition of claim 1, wherein the amino acid profile comprises less than 1 wt % of methionine, and less than 1 wt % of tyrosine.

4. The savory collagen composition of claim 3, wherein the amino acid profile of the collagen is about:

| | |
|---|---|
| Alanine | 8.2 wt % |
| Arginine | 8.5 wt % |
| Glutamic Acid | 6.7 wt % |
| Glycine | 12.6 wt % |
| Histidine | 20.9 wt % |
| Hydroxylysine | 0.9 wt % |
| Hydroxyproline | 11.5 wt % |
| Isoleucine | 1.6 wt % |
| Leucine | 3.0 wt % |
| Lysine | 3.4 wt % |
| Methionine | 0.7 wt % |
| Phenylalanine | 2.1 wt % |
| Proline | 11.6 wt % |
| Serine | 3.4 wt % |
| Threonine | 1.9 wt % |
| Tyrosine | 0.5 wt % |
| Valine | 2.5 wt %. |

5. The savory collagen composition of claim 1, wherein the collagen consists essentially of collagen obtained from grass fed animals.

6. The savory collagen composition of claim 1, wherein the savory spice or flavor component is selected from a buffalo flavor component, a cheese flavor component, a Mexican spice flavor component, an Italian seasoning flavor component, a chili spice or flavor component, an Asian flavor component, a BBQ flavor component and a garlic and herb flavor component.

7. A method of increasing the savory effect of a savory spice or flavor component in a food comprising introducing collagen and the savory spice or flavor component to the food, wherein the collagen and the savory spice or flavor component is introduced simultaneously to the food in an intermixed and powdered form as a savory collagen composition, and the savory collagen composition comprises an amino acid profile that includes at least 10 wt % glycine, at least 10 wt % histidine, at least 10 wt % hydroxyproline, and at least 10 wt % proline.

8. The method of claim 7, wherein the savory collagen composition is introduced prior to cooking the food.

9. The method of claim 7, wherein the savory collagen composition is introduced while cooking the food.

10. The method of claim 7, wherein the savory collagen composition is introduced the food and the food does not undergo cooking prior to consumption.

11. The method of claim 7, wherein the savory collagen composition comprises a mixture of type 1 and type 3 collagen peptides.

12. The method of claim 11, wherein the amino acid profile comprises less than 1 wt % of methionine, and less than 1 wt % of tyrosine.

13. The method of claim 12, wherein the amino acid profile of the collagen is about:

| | |
|---|---|
| Alanine | 8.2 wt % |
| Arginine | 8.5 wt % |
| Glutamic Acid | 6.7 wt % |
| Glycine | 12.6 wt % |
| Histidine | 20.9 wt % |
| Hydroxylysine | 0.9 wt % |
| Hydroxyproline | 11.5 wt % |
| Isoleucine | 1.6 wt % |
| Leucine | 3.0 wt % |
| Lysine | 3.4 wt % |
| Methionine | 0.7 wt % |
| Phenylalanine | 2.1 wt % |
| Proline | 11.6 wt % |
| Serine | 3.4 wt % |
| Threonine | 1.9 wt % |
| Tyrosine | 0.5 wt % |
| Valine | 2.5 wt %. |

14. The method of claim 7, wherein the collagen consists essentially of collagen obtained from grass fed animals.

15. The method of claim 7, wherein the savory spice or flavor component is selected from a buffalo flavor component, a cheese flavor component, a Mexican spice flavor component, an Italian seasoning flavor component, a chili spice or seasoning flavor component, a BBQ flavor component, an Asian flavor component and a garlic and herb flavor component.

* * * * *